(12) United States Patent
Meier

(10) Patent No.: US 10,130,210 B2
(45) Date of Patent: Nov. 20, 2018

(54) BEVERAGE PREPARATION DEVICE

(71) Applicant: Eugster / Frismag AG, Amriswil (CH)

(72) Inventor: Marco Meier, Hombrechtikon (CH)

(73) Assignee: Eugster/Frismag AG, Amriswil (CH)

( * ) Notice: Subject to any disclaimer, the term of this patent is extended or adjusted under 35 U.S.C. 154(b) by 0 days.

(21) Appl. No.: 15/035,502

(22) PCT Filed: Sep. 30, 2015

(86) PCT No.: PCT/EP2015/072569
§ 371 (c)(1),
(2) Date: May 10, 2016

(87) PCT Pub. No.: WO2016/055327
PCT Pub. Date: Apr. 14, 2016

(65) Prior Publication Data
US 2017/0208989 A1    Jul. 27, 2017

(30) Foreign Application Priority Data

Oct. 9, 2014  (DE) .................. 10 2014 114 699

(51) Int. Cl.
*A47J 31/44* (2006.01)
(52) U.S. Cl.
CPC ................. *A47J 31/4482* (2013.01)
(58) Field of Classification Search
CPC ... A47J 31/00–31/0576; A47J 31/44–31/4403; A47J 31/4482–31/467
USPC .......................................... 99/275, 279–323
See application file for complete search history.

(56) References Cited

U.S. PATENT DOCUMENTS

| | | | | |
|---|---|---|---|---|
| 5,520,100 A | * | 5/1996 | Wadell ..................... | A21C 9/04 99/450.1 |
| 5,540,141 A | * | 7/1996 | Grubzak ................ | A23G 9/285 99/450.4 |
| 5,911,813 A | * | 6/1999 | Jensen ................. | A23G 3/0294 134/18 |
| 2011/0113967 A1 | * | 5/2011 | Lin ...................... | B67D 1/0021 99/275 |

FOREIGN PATENT DOCUMENTS

| | | |
|---|---|---|
| DE | 3425943 | 2/1986 |
| DE | 102012202182 | 8/2013 |
| EP | 1512354 | 3/2005 |
| EP | 2628422 | 8/2013 |

OTHER PUBLICATIONS

International Application No. PCT/EP2015/072569 filed Dec. 18, 2015.
German Patent Application No. 10 2014 114 699.9 office action dated Sep. 15, 2015.

* cited by examiner

*Primary Examiner* — Michael Laflame, Jr.
(74) *Attorney, Agent, or Firm* — Bachman & LaPointe, PC

(57) ABSTRACT

The invention relates to a beverage preparation device (1), in particular a coffee machine, comprising a first outlet (4) and a second outlet (5) which are connected, preferably, to a common supply line (10), also comprising adjusting means for adjusting the distance between the first (4) and the second outlet (5).

16 Claims, 5 Drawing Sheets

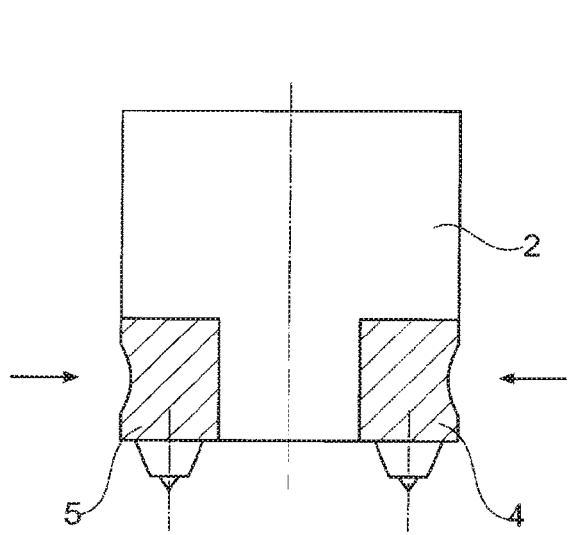
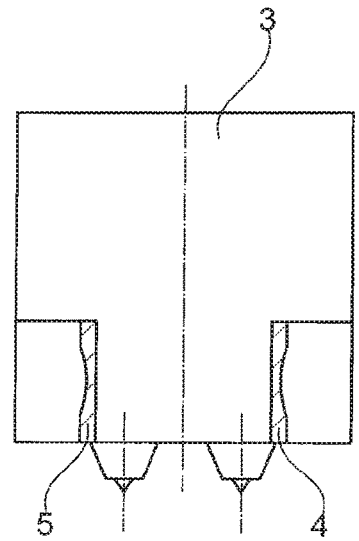
Fig. 3a  Fig. 3b
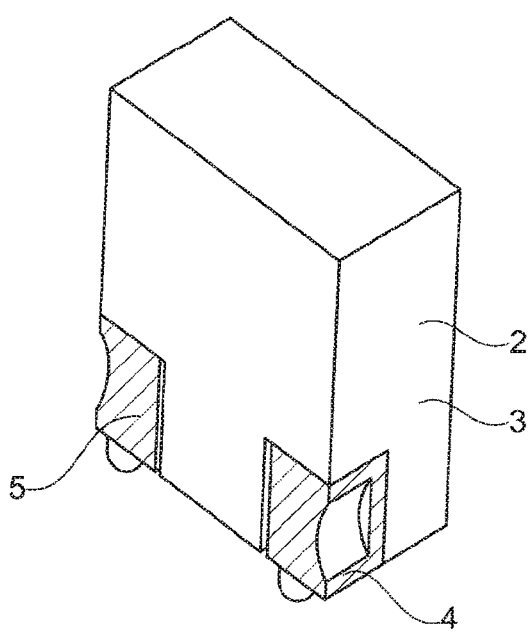
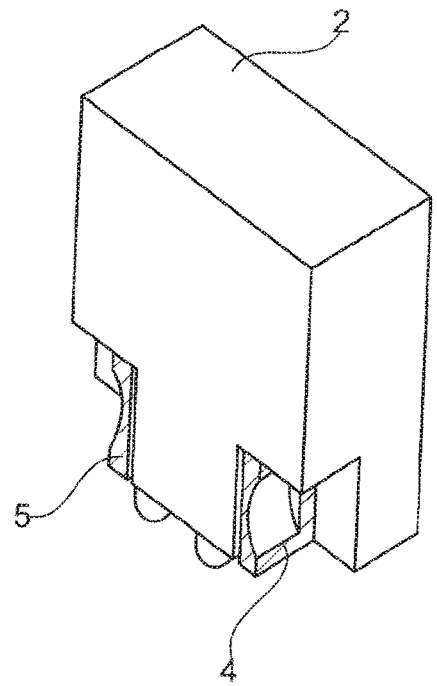
Fig. 3c  Fig. 3d

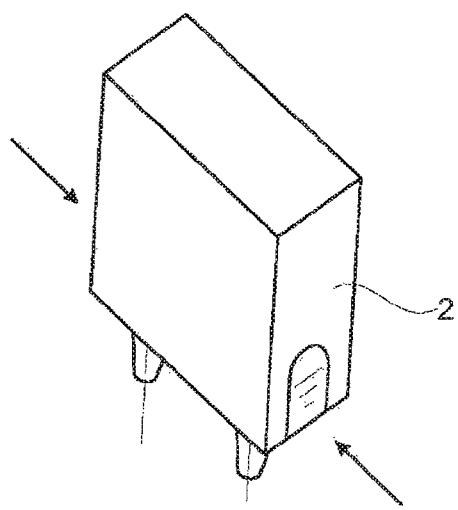
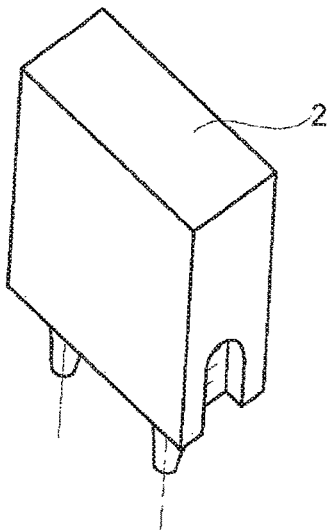
Fig. 6a  Fig. 6b
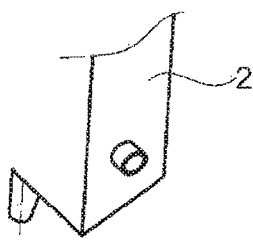
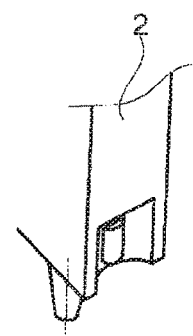
Fig. 7b  Fig. 8b
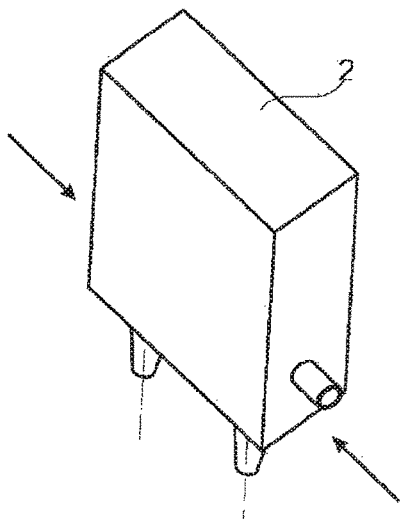
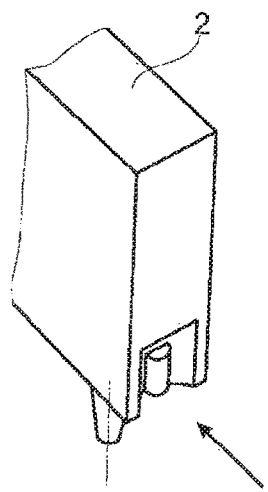
Fig. 7a  Fig. 8a

BEVERAGE PREPARATION DEVICE

BACKGROUND OF THE INVENTION

The invention relates to a coffee machine having a first and a second outlet for a beverage, and adjustment means for adjusting the separation between the first and the second outlets, wherein the first and the second outlets are preferably connected to a common supply line for supplying both outlets simultaneously with a beverage. The invention further relates to a method for adjusting the separation between a first and a second outlet of a beverage preparation device.

A beverage preparation device having two outlets, wherein the outlets are each rotatable about a vertical axis to adjust the horizontal separation between them is known from EP 1 512 354 A1. The separation adjustment is continuously variable. However, it is considered a drawback that it is difficult to set defined (specified) distances repeatedly. The known solution is also expensive and is not satisfactory in terms of sturdiness.

A beverage preparation device in which two outlets are formed by bendable drain pipes that can be spread apart from one another is known from DE 34 25 943 C1. When operated, the outlets are only aligned parallel with one another if the separation between them is very small. Moreover, the difficulty of setting defined (specified) distances repeatedly is considered a drawback in this embodiment as well. In particular, the relative positions of the outlets are coupled rigidly via a common sliding guide.

A beverage outlet head in which two outlets are adjustable relative to each other by altering the heights thereof at the same time is known from DE 10 2012 202 182 A1.

SUMMARY OF THE INVENTION

Based on the abovementioned prior art, the object underlying the invention is to suggest a beverage preparation device having sturdy adjustment means that can be made inexpensively for adjusting (varying) the separation between a first and at least one second outlet, wherein the adjustment means are preferably constructed in such manner that defined (specified) separation settings are easily repeatable and/or easily selectable by the user. The object further consists in suggesting a method for adjusting the separation between two outlets in a beverage preparation device, wherein the method should enable repeated adjustments of defined distances to be made simply. The device and the method should preferably (but not necessarily) ensure that the outlet ends of the outlets are aligned vertically and/or parallel to one another all relative positions thereof.

This object is solved with regard to the beverage preparation device with the features disclosed herein, that is to say in a species-related beverage preparation device, in that according to a first option the adjustment means comprise a first sliding guide track, and that the first outlet, being displaceable along a first movement track, is coupled via first coupling means with first engaging means which are displaceable along the first sliding guide track, and that the first sliding guide track defines at least two different first retaining positions for the first engaging means, and therewith also corresponding first stop positions for the first outlet along the movement track thereof due to the coupling with the first retaining positions, and that spring means preferably braced on the first outlet are allocated to the first engaging means, which spring means are designed and arranged to bias the first engaging means into the respective first retaining position by applying a spring force thereto, and that according to a further option, which is feasible in addition or alternatively to the first option, the adjustment means comprise a second sliding guide track, and that the second outlet, being displaceable along a second movement track, is coupled via second coupling means with second engaging means which are displaceable along a second sliding guide track, and that the second sliding guide track defines at least two different second retaining positions for the first engaging means, and therewith also corresponding second stop positions for the second outlet along the second movement track thereof due to the coupling with the second retaining positions, and that spring means preferably braced on the second outlet are allocated to the second engaging means, which spring means are designed and arranged to bias the second engaging means into the respective second retaining position by applying a spring force thereto.

With regard to the method, the object is solved with the features disclosed herein, that is to say in a species-related method, in that the first outlet, which is coupled via first coupling means with first engaging means which are displaceable along a first sliding guide track, is displaced along a first movement track into one of at least two first stop positions in order to adjust the separation, each of which stop positions is defined along the first sliding guide track by a first retaining position for the first engaging means, and that the first engaging means are biased into the respective first retaining position by a spring force, particularly indirectly via the first outlet, and that the second outlet, which is coupled via second coupling means with second engaging means which are displaceable along a second sliding guide track, is displaced along a second movement track into one of at least two second stop positions in order to adjust the separation, each of which stop positions is defined along the second sliding guide track by a second retaining position for the second engaging means, and that the second engaging means are biased into the respective second retaining position by a spring force, particularly indirectly via the second outlet.

Advantageous refinements of the invention are described in the subordinate claims. All combinations of at least two of the features disclosed in the description, the claims and/or in the figures fall within the scope of the invention. In order to avoid repetitions, features that are disclosed with respect to the device are deemed to be disclosed and claimable with respect to the method, and equally, features that are disclosed with respect to the method are deemed to be disclosed and claimable with respect to the device.

The invention is based on the idea of providing a first and a second sliding guide track as components of the adjustment means for displacing the first and the second outlet, and along these tracks engaging means coupled via coupling means to the respective outlets are displaceable, wherein each of the sliding guide tracks defines at least two different (defined) retaining positions (particularly locking positions) for the corresponding engaging means, wherein one stop position along the movement track of the outlet is allocated to each retaining position for the engaging means due to the coupling with the associated outlet via the associated coupling means. The engaging means are also pressed into respective retaining positions indirectly or directly by spring force with the aid of corresponding spring means, to secure the engaging means in the respective retaining position. In other words, the spring means are designed and arranged such that the engaging means is secured and fixed firmly in the retaining position and the allocated outlet is consequently secured and fixed firmly in the respective stop position. This reliably prevents them from being displaced inadvertently, for example due to vibration of the beverage preparation device, and they are retained firmly in their respective defined positions.

The provision of at least two retaining positions (locking positions) for the engaging means, and consequently at least two defined stop positions for the allocated outlet along the movement track thereof has the following considerable advantages over the known swivelling or bending mechanisms. Thus, a sturdy sliding guide track and its engaging and coupling mechanism with the outlet can be produced simply and inexpensively. Another major advantage consists in that at least two, preferably more than two, for example exactly three or exactly four defined distances between the outlets may be set precisely and repeatably, which is not the case with the known, stepless swivelling mechanisms. The spring loading of the engaging means (directly or indirectly), e.g., through the application of a spring force of the outlet coupled to the engaging means (by power transmission or mechanical means) guarantees not only that the outlet will be secured in the respective stop position (allocated to a corresponding retaining position), but also makes it possible for the respective outlet to be moved along its movement track more easily. To do this, a force must be applied to the outlet in question, particularly manually, to counteract the corresponding outlet—the desired retaining position of the engaging means and thus also of the corresponding stop position of the outlet is then set automatically as it were, when the force application is interrupted or removed.

It is provided according to the invention that one sliding guide track, engaging means and coupling means is allocated to each of the two, preferably each of all outlets, each of which defines retaining positions for the allocated engaging means and thus also stop positions for the respective outlet, so that both outlet may then be displaced, depending on their configuration either independently from one another or preferably simultaneously along the respective movement track, to set the separation between defined stop positions, preferably in steps. The first and/or second coupling means are preferably designed and arranged to transfer tensile and/or compressive forces.

With regard to the actual design of the first or second sliding guide track, there are a number of options. For example, a sliding guide track may be formed by a circumferentially closed, i.e. circuitous rail, or by a preferably circumferentially closed guide groove, wherein the engaging means—regardless of the actual configuration of the sliding guide track—is designed to cooperate therewith so that the track form may be engaged thereby as it moves along the sliding guide track.

It is particularly preferred if the first sliding guide track—and the second sliding guide track as well if two sliding guide tracks are provided—is/are circumferentially enclosed, so that the respective engaging means are displaceable along a circuitous track, preferably not a circular ring track, along the sliding guide track, such that any point on the sliding guide track may be passed through again in only one circumferential direction around the movement track by displacing the respective engaging means.

In general, it is possible to construct the coupling means rigidly, for example as a rigid connecting arm, wherein the engaging means may be formed by one end of said arm. In this case, if the arrangement or design of the coupling means is not articulated, the course of the movement track of the allocated outlet corresponds to the course of the sliding guide track. However, as a result the course of the outlet's movement track is then two-dimensional, which is avoided in a refinement of the invention. In order to render the course of the respective outlet's movement track independently of the course (track shape) of the sliding guide track, in a refinement of the invention it is therefore provided that the first coupling means are designed such that the track course, that is to say the shape of the first movement track differs from the course of the sliding guide track, wherein it is particularly preferred if the movement track of one outlet follows a straight line, i.e. is one-dimensional. In this way, it may be ensured that the separation between the correspondingly coupled outlet and a fixed housing of the beverage preparation device remains constant along the movement track regardless of its position, and without reference to the preferably circumferentially closed course of the sliding guide track.

Instead of a straight movement track, a two-dimensional, e.g., arched track may be chosen for the outlet, if the separation between at least one outlet and a beverage preparation device housing is to be changed at the same time as the separation between the outlets is changed. Regardless of the actual configuration of the movement track course of first or the second outlet, it is preferably not circumferentially closed, instead the outlet is moved back and forth along the movement track.

In order to create a movement track course that differs from the course of the sliding guide track, it has proven advantageous if the first and/or second coupling means have at least sections that are constructed flexibly, for example as an elastically bendable plastic strip or arm, and/or comprise(s) at least one, preferably two articulated connections.

It has proven particularly advantageous for purposes of a particularly simple and sturdy form of the engaging and coupling means if the coupling means are constructed as a preferably rigid arm with articulated bearing, wherein a preferably angled end or section of the arm forms the engaging means that are displaceable along the associated sliding guide track, wherein said arm end or arm section is preferably arranged on or on the sliding guide track so that it can swivel while moving along the sliding guide track. Also preferably, one opposing end or section of the arm is connected in swivelling, articulated manner to the outlet, preferably a section of the outlet housing, so that the coupling means with integrated engaging means provide an articulated connection with both the sliding guide track and the outlet. Instead of an articulated connection with the outlet, the coupling means may also be of elastically bendable construction.

It has proven to be particularly advantageous if at least one of the outlets is coupled with the engaging means that are allocated thereto, preferably integrated therein and formed thereby or alternatively separately therefrom in such manner that said outlet can be displaced once back and forth about or along the associated sliding guide track along the preferably linear movement track thereof with one complete revolution of the associated engaging means. This embodiment makes it possible to move the outlet easily to positions with various distances between the outlets by repeatedly pressing the outlet, particularly in a horizontal plane, against the spring loading.

It is particularly preferred in this context if both outlets are displaceable or displaced in opposite directions simultaneously, preferably each in a straight line.

As indicated previously, the engaging means are forced into the respective retaining positions by spring loading. This may be effected directly by providing a corresponding spring to act on the engaging means. However, the spring loading is preferably applied indirectly, particularly by providing at least one spring braced on the outlet which is allocated to the engaging means, which is particularly advantageous if the associated outlet is displaceable solely in a straight line.

It is particularly expedient if, in the event that at least two engaging means are provided for different outlets, shared spring means are provided to bias multiple, particularly the two engaging means into a respective retaining position, in which case it is particularly expedient if said shared spring means particularly bias the first and second outlets away from one another, particularly in a horizontal plane. When viewed from the front of a beverage preparation devices, it is particularly advantageous if one of the outlets is biased to the right by spring force, and the other to the left. In order to enable a possible inexpensive and sturdy design of shared spring means, it has proven advantageous if a compression spring is provided as the shared spring means, and is arranged between the outlets and biases said outlets apart from one another, that is to say in opposite directions.

One way to create sturdy retaining positions (and therewith also the stop position of at least one outlet) particularly inexpensively is provided if the retaining positions are formed or defined by a change of direction, particularly a curved or corner section of the sliding guide track, wherein the engaging means are biased by spring force into the curve or corner of the sliding guide track resulting from said change of direction by the spring means acting indirectly or directly thereon. In addition or alternatively thereto, it is possible to form a retaining section from a blind section of the sliding guide track, into which the engaging means are biased by spring force, wherein in order to change this retaining position the engaging means must be moved out of said blind section again, particularly by pressing on the allocated outlet against the direction of the spring force, particularly in the direction opposite the movement by which it was moved into the blind section.

With regard to the present case of two outlets, each being coupled to a sliding guide track and each being displaceable along a movement track, it has proven advantageous if the sliding guide tracks and/or the movement tracks of the outlets are arranged and designed in mirror symmetrical manner, particularly in mirror symmetrical manner about a vertical plane extending in the middle between the outlets, which is preferably aligned at right angles to a rear wall of the beverage preparation device and/or parallel to a side wall thereof.

It has proven particularly advantageous if the outlets of the beverage preparation device are displaceable vertically together with the adjustment means, wherein the inventive of the adjustment means makes it possible for the outlet ends to be oriented vertically and parallel with one another in any position of the outlets along the first and second movement track.

The invention also presents a method for preferably stepped and defined adjustment of the separation between a first outlet and a second outlet of a beverage preparation device, wherein the beverage preparation device is preferably a beverage preparation device constructed according to the inventive design.

In view of the above, it is provided according to the invention that both outlets, each being coupled via coupling means with engaging means that are displaceable along an allocated sliding guide track and are preferably formed by said coupling means, are displaced along a movement track for each outlet into one of at least two stop positions to set the separation between the outlets, which stop positions are each defined or preset along the sliding guide track by a retaining position for the engaging means, and that a spring force is applied to the engaging means either directly, or preferably indirectly via a spring loading of the outlets to hold said engaging means in said respective retaining positions. According to the invention, the method is preferably performed on both outlets simultaneously, i.e., the two outlets are displaced from one stop position to another along their respective movement tracks simultaneously, and the corresponding engaging means are moved from one retaining position to another along the respective guide track at the same time due to their coupling with the outlets.

It has proven particularly expedient if the two outlets are guided by corresponding guidance means in such manner that the movement tracks of the outlets are aligned with each other along an axis, wherein the two outlets are displaced along their respective movement tracks preferably simultaneously, and particularly preferably in opposite directions, or axial directions, at the same time.

It has proven particularly expedient if the outlets are guided by corresponding guidance means in such manner that the movement tracks of the outlets are aligned with each other, wherein the two outlets are displaced along their respective movement tracks preferably simultaneously, and particularly preferably in opposite directions, or axial directions, at the same time.

It is particularly expedient of the method is assured by a corresponding construction, particularly an articulated and/or flexible construction of the coupling means, in such manner that if at least one outlet completes a full back and forth movement along its movement track the associated engaging means also travel once around the associated sliding guide track.

Particularly in the case that the two outlets are each displaceable along a straight movement track and are moved in opposite directions under spring force, it is advantageous if the application of manual force to the outlets causes a displacement of the outlets towards each other, wherein the outlets and their allocated engaging means are displaced from their respective current retaining positions by the application of force and when the outlets are then released they are displaced automatically along the respective sliding guide track into the next retaining position in the circumferential direction, so that the outlets are moved to the next stop position, in which they are kept firmly in place by the spring means until the next application of force counteracting the spring force.

BRIEF DESCRIPTION OF THE DRAWINGS

Further advantages, features and particularities of the invention will be apparent from the following description of preferred embodiments and with reference to the drawing.

In the drawing:

FIG. 6a and FIG. 6b show further design variants of outlets, FIG. 7a and FIG. 7b show yet more alternative embodiments of outlets, and FIG. 8a and FIG. 8b show another alternative embodiment of the outlets.

In the figures, identical elements and elements with the same function are denoted by the same reference signs.

DETAILED DESCRIPTION

Figure 1A:
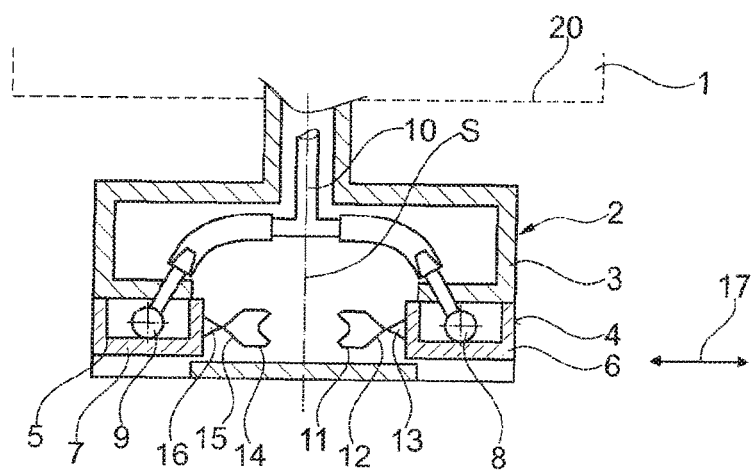
FIG. 1a is a plan view of a beverage preparation device with two outlets.

FIG. 1a shows a plan view of a beverage preparation device, preferably a brewing unit comprising a coffee machine, for example a capsule machine or fully automatic coffee maker. Beverage preparation device 1 comprises an outlet unit 2 with an outlet unit housing 3, on which a first and a second outlet 4, 5 are each displaceable along a straight first and second horizontal movement track. Each outlet 4, 5 comprises a first and a second outlet housing 6, 7 and a first and a second drain pipe 8, 9, each of which is connected in fixed manner to the respective outlet housing 6, 7.

Outlets 4, 5 are connected flexibly and in fluid-transporting manner to a shared supply line 10 to ensure the both outlets 3, 4 are supplied with a prepared beverage, particularly coffee.

Adjustment means are provided to adjust the—in this case—horizontal distance between the first and the second outlet. The adjustment means comprise a first sliding guide track 11, which is operatively connected to first outlet 4, first engaging means 12 which are displaceable along the first sliding guide track 11, and first coupling means 13 for transferring compressive and tensile forces to the first outlet 4, 5. It will be noted that first sliding guide track 11 is circumferentially closed and has a circuitous, non-circular guide track course that differs from the linear movement course of first outlet 4, as will be explained in detail later. Similarly, a second sliding track guide 14 is allocated to the second outlet 15, as well as second engaging means 15 and second coupling means 16. The two outlets 5 are displaceable simultaneously along parts 17 representing the linear movement tracks, in the embodiment described here in such manner that the first and the second outlet 4, 5 may only be displaced simultaneously towards and away from one another in the direction of arrows 17, and particularly between respective stop positions.

Figure 1B:
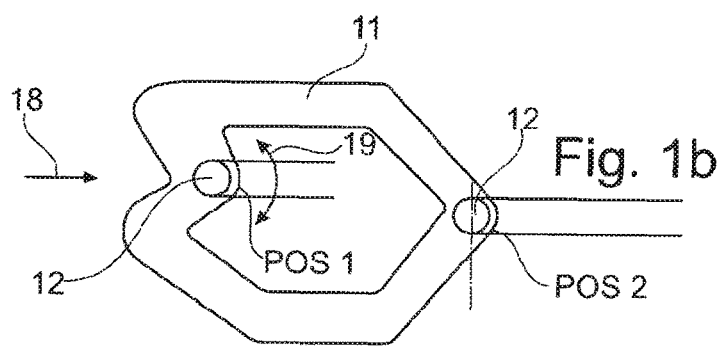
FIG. 1b is an enlarged detail of a first sliding guide track with engaging and coupling means of FIG. 1a, FIG. 1c is an accurate outline representation of the coupling means of FIG. 1b with integrated engaging means.

FIG. 1b is an enlarged view of first sliding guide track 11. Two first retaining positions identified as Pos1 and Pos2 are shown, which are formed by changes of direction or turning points in the course of first sliding guide track 11. First engaging means 12, represented in the two retaining positions Pos1 and Pos2 for illustrative purposes in FIG. 1b, are displaceable along sliding guide track 11, although of course they can only occupy one retaining Pos1 or Pos2 at one time. First engaging means 12 are biased under spring force in the direction of arrow 18 as will be explained later, so that engaging means 12 are biased into the respective turning point, i.e., into the respective retaining position Pos1 of Pos2, under spring force.

Figure 1C:
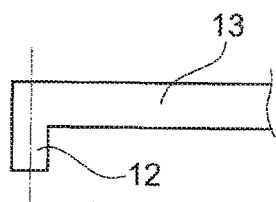
FIG. 1d is a front view of the outlets of FIG. 1a, wherein the representation of the sliding guide tracks is omitted for the sake of clarity.

As may be seen from the side view according to FIG. 1c, engaging means 12 are an integral part of first coupling means 13, and in this case are formed by an end section projecting at an angle and, as indicated by arrow directions 19, they are supported so as to be able to pivot during displacement along circumferentially closed guide track 11. With regard to this particular configuration of first coupling means 13, there are a number of possibilities. According to a first embodiment, for example, they may be connected to the first outlet in non-articulated manner—in this case the first coupling means 13 are preferably flexible, particularly having the form of flexible plastic strips, in order to convert the movement of engaging means 12 along sliding guide track 11 into the linear movement track of the first outlet. Or, it is possible to construct first coupling means 13 as a rigid arm, which is then connected to first outlet 4, preferably to first outlet housing 6, preferably via an articulated joint.

Since the first outlet is coupled with first sliding guide track 11, one stop position of the first outlet 4 is allocated to each of the two retaining positions Pos1 and Pos2. When force is applied against spring loading 18, engaging means 12 are moved out of their respective retaining positions against the spring loading and after the preferably manually applied pressing force is removed or reduced, they are able to engage in the respective other retaining position, which is accompanied by a change of stop position of the allocated first outlet. If the engaging means are moved through a complete circumferential circuit of the sliding guide track, the allocated outlet is moved once back and forth between the stop positions corresponding to the retaining positions.

The first and second sliding guides 11, 14 are preferably constructed with mirror symmetry about a mirror plane S, which is a vertical plane in the embodiment shown, oriented perpendicularly to a front side of a housing 20 of beverage preparation device 1 and perpendicularly to a support surface.

Figure 1D:
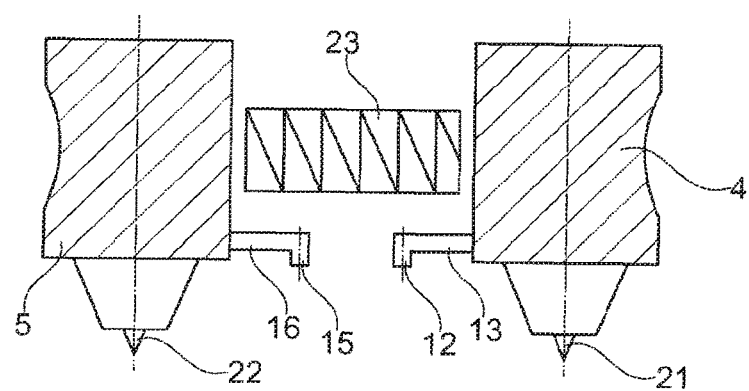

FIG. 1d shows a front view of first and second outlets 4, 5. A first and a second outlet end 21, 22 in vertical orientation are evident. Shared spring means 23 for the indirect application of a spring force to both engaging means are also shown. For this purpose, in the embodiment shown, spring means 23 bear on outlets 4, 5, more particularly on outlet housings 6, 7. The first and the second engaging means 12, 15 with the integral first and second coupling means 13, 16 are also evident. The sliding guide tracks indicated in outline in FIG. 1a, which may be arranged in a horizontal plane as shown in FIG. 1a, are not represented for the sake of clarity—an arrangement in another plane, a vertical plane for example, is feasible as an alternative.

Figure 2A:
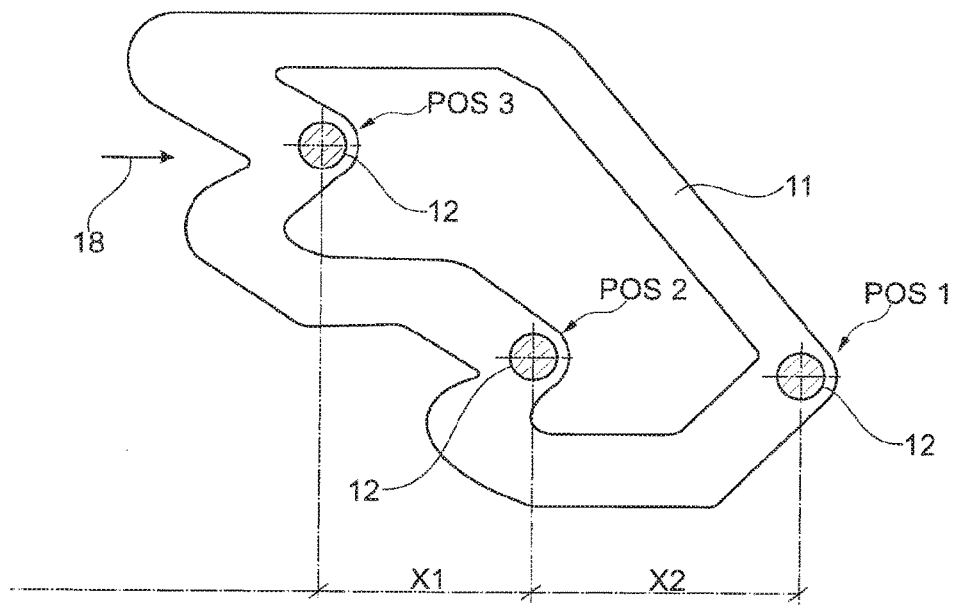
FIG. 2a is an alternative embodiment of a sliding guide track.

In FIG. 2a, an alternatively configured sliding guide track 11 is shown, which defines a total of three retaining positions, Pos1, Pos2 and Pos3, arranged with circumferential separation from each other, for first engaging means 12. The distance between retaining positions Pos2 and Pos3 is represented by X1, and the distance between retaining positions Pos1 and Pos2 is represented by X2 in the horizontal direction—accordingly, the separation between the outlets is smallest when engaging means 12 are in Pos3, and largest when engaging means 12 are in Pos1. A stop position of the allocated outlet corresponds to each of the three retaining positions.

Figure 2B:
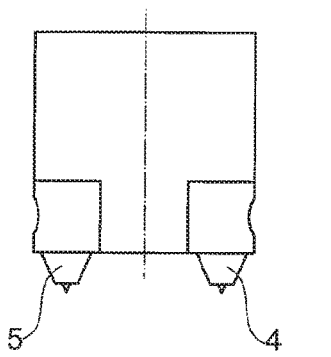
FIG. 2b to FIG. 2d are stop positions created for an outlet from a sliding guide track according to FIG. 2a, FIG. 3a to FIG. 3d are various stop positions of outlets.
Figure 2C:
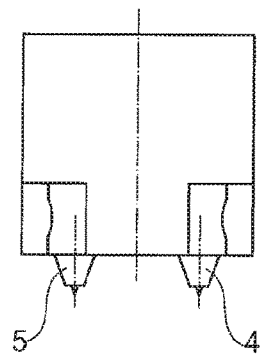
Figure 2D:
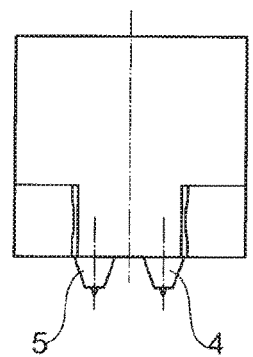

The sliding guide track for the second outlet is preferably in mirror symmetrical arrangement with the first sliding guide track, and is not shown here in order to preserve clarity. Assuming such a second sliding guide track with associated engaging and coupling means exists for the second outlet, the relative and stop positions of the first and the second outlets 4, 5 would be those shown in FIGS. 2a to 2d. In FIG. 2b, the first engaging means are in position 1 and the second engaging means are in a corresponding retaining position with the maximum separation, so that the stop positions shown are created for the first and the second outlets 4, 5, with the maximum horizontal distance between them. In the representation of FIG. 2c the first engaging means are in retaining position Pos2 and the second engaging means are in the retaining position corresponding mirror-symmetrically thereto, resulting in the creation of the two middle stop positions for outlets 4, 5 according to FIG. 2c. In FIG. 2d, the first engaging means are in retaining position Pos3, and the second engaging means are in the corresponding retaining position—not shown—resulting in positions of outlets 4, 5 with the smallest separation, according to FIG. 2d.

FIG. 3a and FIG. 3c show different views of an outlet unit 2 having two outlets 4, 5, which are in stop positions with the maximum horizontal distance between them. Outlet unit 2 is arranged so as to be vertically displaceable, while outlets 4, 5 are each displaceable along a horizontal, straight movement track.

FIG. 3b and FIG. 3d show outlets 4, 5 of outlet unit 2 in stop positions with the minimum horizontal distance between them. The two stop positions in each case may be created by producing two sliding guide tracks in mirror symmetrical relationship with one another, wherein a first sliding guide track may be constructed as shown in FIG. 1b.

Figure 4A:
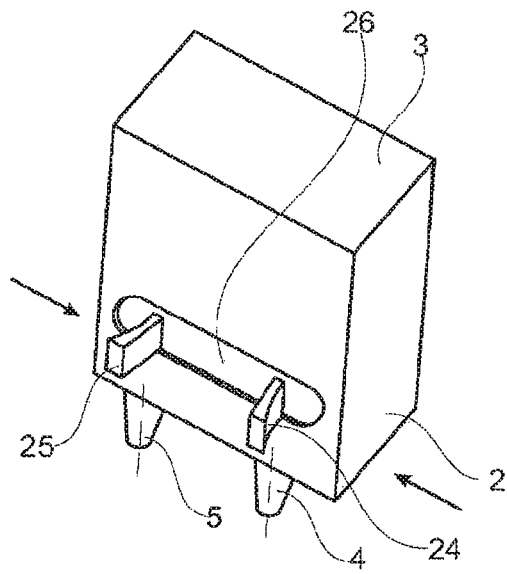
FIG. 4a and FIG. 4b show a variation of the outlets of FIGS. 3a to 3d, FIG. 5a and FIG. 5b show a further alternative embodiment of the outlets.
Figure 4B:
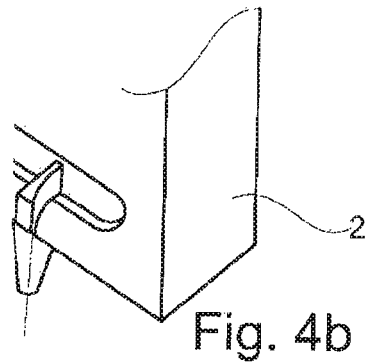

FIGS. 4a and 4b show a variant of outlet unit 2 that differs from those of FIGS. 3a to 3d. Each outlet 4, 5 has an associated holding section 24, 24, and holding sections protrude through an opening 26 in the front of housing 3.

FIG. 4a shows two stop positions with maximum separation, while FIG. 4b shows stop positions with a minimum separation. A sliding guide track such as is shown in FIG. 1b for example may also serve as the basis in the embodiment of FIGS. 4a and 4b. Of course, it is also possible to create at least one further relative position or stop position for outlets 4, 5 along the linear movement tracks thereof, in which case a sliding guide track such as the one shown in FIG. 2a for example may be used.

Figure 5A:
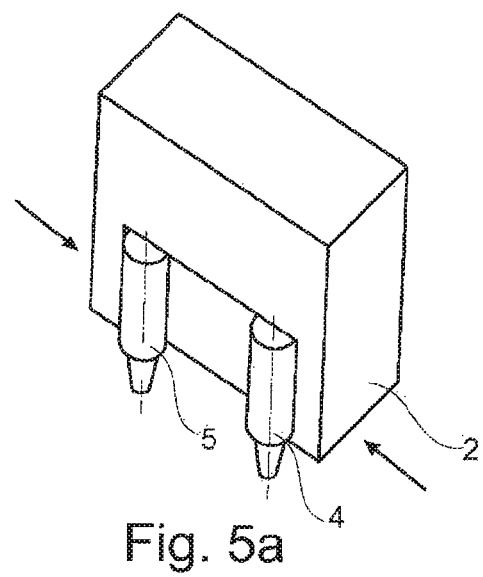
Figure 5B:
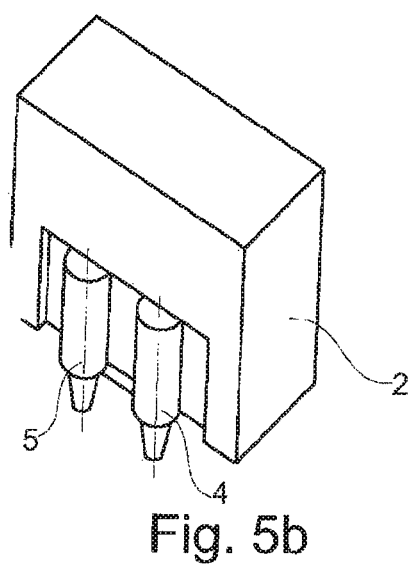

FIGS. 5a and 5b show further design variation options for outlets 4, 5, wherein outlets 4, 5 protrude even farther than in the embodiment of FIGS. 4a and 4b.

Further outlet units 2 are shown in FIGS. 6a and 6b, FIGS. 7a and 7b, and FIGS. 8a and 8b—a common feature of all of which being that the corresponding outlets can be operated from the side. The arrows shown symbolise a force application device for displacing the outlets—and the engaging means at the same time—, between the stop and retaining positions respectively.

The invention claimed is:

1. Beverage preparation device (1), comprising a coffee machine, having a first outlet (4) and a second outlet (5), which are connected to a common supply line (10) and to adjustment means for adjusting separation between the first outlet (4) and the second outlet (5), wherein
the adjustment means comprise a first sliding guide track (11), and the first outlet (4), being displaceable along the first movement track, is coupled via first coupling means (13) with a first engaging means (12) which are displaceable along the first sliding guide track (11), and wherein the first sliding guide track (11) defines at least two different first retaining positions for the first engaging means (12), and therewith also corresponding first stop positions for the first outlet (4) along the movement track thereof, and wherein spring means (23), which are braced on the first outlet (4), are allocated to the first engaging means (12), wherein the spring means are designed and arranged to bias the first engaging means (12) into the respective first retaining position by applying a spring force thereto,
and wherein the adjustment means comprise a second sliding guide track (14), and the second outlet (5), being displaceable along a second movement track, is coupled via second coupling means (16) with second engaging means (15) which are displaceable along the second sliding guide track (14), and wherein the second sliding guide track (14) defines at least two different second retaining positions for the second engaging means (15), and therewith also corresponding second stop positions for the second outlet (5) along the second movement track thereof due to the coupling with the second retaining positions, and wherein spring means (23), braced on the second outlet (5), are allocated to the second engaging means (15), which spring means are designed and arranged to bias the second engaging means (15) into the respective second retaining position by applying a spring force thereto.

2. Beverage preparation device according to claim 1, wherein the first and/or second sliding guide track (11, 14) is/are circumferentially closed.

3. Beverage preparation device according to claim 1, wherein the first outlet (4) is coupled via the first coupling means (13) with the first engaging means (12), which are displaceable along the first sliding guide track (11), and is guided via first guidance means in such manner that the track course of the first movement track differs from the course of the first sliding guide track (11) in such manner that the first movement track extends exclusively along a first straight line, and/or the second outlet (5) is coupled via the second coupling means (16) with the second engaging means (15), which are displaceable along the second sliding guide track (14), and is guided via second guidance means in such manner that the track course of the second movement track differs from the course of the second sliding guide track (14) in such manner that the second movement track extends exclusively along a second straight line.

4. Beverage preparation device according to claim 3, wherein at least a section of the first coupling means (13) is of flexible construction and/or comprises at least one articulated connection, and/or wherein at least a section of the second coupling means (16) is of flexible construction and/or comprises at least one articulated connection.

5. Beverage preparation device according to claim 3, wherein the first engaging means (12) and the first coupling means (13) are constructed from a first common part which is connected via an articulation to the first sliding guide track (11) and/or the first outlet (4), and/or wherein the second engaging means (15) and the second coupling means (16) are constructed from a second common part which is connected via an articulation to the second sliding guide track (14) and/or the second outlet (5).

6. Beverage preparation device according to claim 3, wherein the first outlet (4) is displaceable once back and forth along the first linear movement track with one complete revolution of the first engaging means (12) along the first sliding guide track (11), and/or wherein the second outlet (5) is displaceable once back and forth along the second linear movement track with one complete revolution of the second engaging means (15) along the second sliding guide track (14).

7. Beverage preparation device according to claim 1, wherein the spring means (23) bias the first outlet (4) and the second outlet (5) away from each other by spring force.

8. Beverage preparation device according to claim 1, wherein the first and the second engaging means (12, 15) are biased by spring force in opposite directions via common spring means (23) bearing on the first outlet and the second outlet (4, 5).

9. Beverage preparation device according to claim 1, wherein the various first retaining positions are defined by a change of direction of the first sliding guide track (11) and/or a blind section of the first sliding guide track (11), and/or wherein the various second retaining positions are defined by a change of direction of the second sliding guide track (14) and/or a blind section of the second sliding guide track (14).

10. Beverage preparation device according to claim 1, wherein the first and the second sliding guide track (11, 14), and/or the movement tracks of the first outlet and the second outlet (4, 5) are of mirror symmetrical construction symmetrically about a vertical plane.

11. Beverage preparation device according to claim 1, wherein the first outlet and the second outlet (4, 5) are arranged to be displaceable vertically together with the adjustment means, wherein outlet ends of the first outlet and the second outlet are aligned vertically and parallel to each other in every position along the first and second movement tracks.

12. Method for adjusting the separation between a first outlet (4) and a second outlet (5) of a beverage preparation device, wherein the first outlet (4), which is coupled via first coupling means (13) with first engaging means (12) which are displaceable along a first sliding guide track (11) is displaced along a first movement track into one of at least two first stop positions in order to adjust the separation, each of which stop positions is defined along the first sliding guide track (11) by a first retaining position for the first engaging means (12), and wherein the first engaging means (12) are biased into the respective first retaining position by a spring force acting indirectly via the first outlet (4), and wherein the second outlet (5), which is coupled via second coupling means (16) with second engaging means (15) which are displaceable along a second sliding guide track (14), is displaced along a second movement track into one of at least two second stop positions in order to adjust the separation, each of which stop positions is defined along the second sliding guide track (14) by a second retaining position for the second engaging means (15), and wherein the second engaging means (15) are biased into the respective second retaining position by a spring force acting indirectly via the second outlet (5).

13. Method according to claim 12, wherein the first and second outlets (4, 5) are displaced simultaneously along their respective, straight movement tracks in opposite directions.

14. Method according to claim 12, wherein for one complete back and forth motion of the first outlet (4) along the first movement track, the first coupling means (13) perform one complete revolution round the first sliding guide track (11), and/or wherein for one complete back and forth motion of the second outlet (5) along the second movement track, the second coupling means (16) perform one complete revolution round the second sliding guide track (14).

15. Beverage preparation device according to claim 5, wherein the first common part is a first rigid or flexible arm, and/or wherein the second common part is a second rigid or flexible arm.

16. Beverage preparation device according to claim 8, wherein the opposite directions are horizontal directions, and wherein the common spring means is a compression spring arranged between the outlets (4, 5).

* * * * *